United States Patent [19]

Uchida et al.

[11] Patent Number: 5,499,350
[45] Date of Patent: Mar. 12, 1996

[54] VECTOR DATA PROCESSING SYSTEM WITH INSTRUCTION SYNCHRONIZATION

[75] Inventors: Keiichiro Uchida, Kawasaki; Tetsuro Okamoto, Machida, both of Japan

[73] Assignee: Fujitsu Limited, Kawasaki, Japan

[21] Appl. No.: 469,769

[22] Filed: Jun. 6, 1995

Related U.S. Application Data

[63] Continuation of Ser. No. 599,602, Apr. 16, 1984, abandoned, which is a continuation of Ser. No. 296,264, filed as PCT/JP80/00333, Dec. 27, 1980, abandoned.

[51] Int. Cl.⁶ .................................................. G06F 9/30
[52] U.S. Cl. ............................. 395/375; 364/DIG. 1; 364/DIG. 2; 364/232.21
[58] Field of Search .................... 364/DIG. 1 MS File, 364/DIG. 2 MS File; 395/200, 375, 800

[56] References Cited

U.S. PATENT DOCUMENTS

| | | | |
|---|---|---|---|
| 3,560,934 | 2/1971 | Ernst et al. | 364/200 |
| 3,614,742 | 10/1971 | Watson et al. | 364/200 |
| 4,107,773 | 8/1978 | Gilbreath et al. | 364/200 |
| 4,128,880 | 12/1978 | Cray | 364/200 |
| 4,149,243 | 4/1979 | Wallis | 364/200 |
| 4,365,292 | 12/1982 | Barnes et al. | 364/200 |

OTHER PUBLICATIONS

Duke et al, IBM Technical Disclosure Bulletin, "Wait/Post Without Locking in a Multiprocessing System", vol. 15, No. 10, Mar. 1973.

Boggs et al, IBM Technical Disclosure Bulletin, "Event Completion and Event Feedback Seperation", vol. 16, No. 3, Aug. 1973.

Gum, IBM Technical Disclosure Bulletin, "Waiting for One-of-n Events", vol. 15, No. 12, May 1973.

"The Cray-1 Computer System" Communications of the ACM Jan. 1978, Russel.

Primary Examiner—Robert B. Harrell
Attorney, Agent, or Firm—Staas & Halsey

[57] ABSTRACT

An information processing system including an arithmetic unit in which one unit of data is processed according to a corresponding one instruction, and another arithmetic unit in which a great amount of data are processed according to a corresponding instruction. Also included is an instruction controller which distributes instructions selectively to respective arithmetic units (12) and a main storage (12) which achieves two-way data communication with the arithmetic units. In the system synchronization is performed with respect to instructions, among the aforesaid instructions, which, above all, must be executed in respective fixed execution sequences, by utilizing a newly employed synchronization instruction. Further, the aforesaid instructions are classified, in dependence upon the execution sequence, into first instructions which are to be executed under a serial processing mode and second instructions which can be executed under a parallel processing mode, by inserting both a serialized-starting instruction (POST) and a serialized-releasing instruction into the aforesaid instructions.

9 Claims, 9 Drawing Sheets

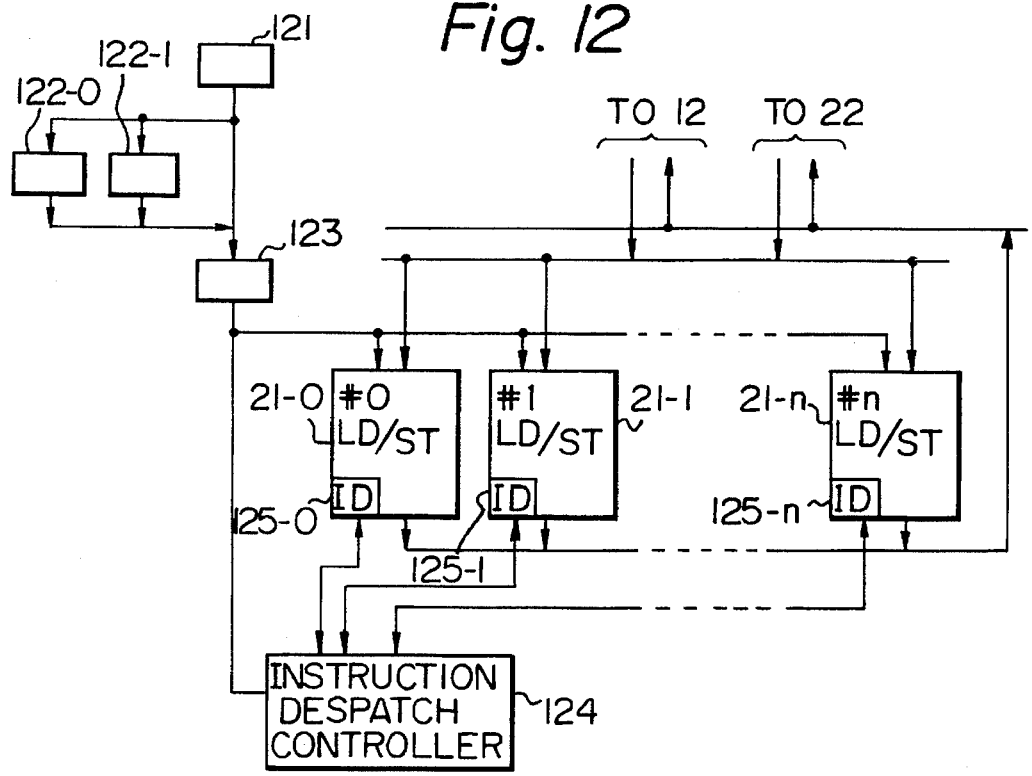

VECTOR DATA PROCESSING SYSTEM WITH INSTRUCTION SYNCHRONIZATION

This application is a continuation of application Ser. No. 06/599,602, filed Apr. 16, 1984, now abandoned, which is a continuation of application Ser. No. 296,264, filed as PCT/JP80/00333, Dec. 27, 1980, now abandoned.

BACKGROUND OF THE INVENTION

The present invention relates to an information processing system and, more particularly, relates to an information processing system for processing, at high speed, a great amount of data, such as data to be processed in a scientific technical calculation, that is a so-called super computer.

When it is required to realize an information processing system for processing, at high speed, a great amount of data, such as the data to be processed in a scientific technical calculation, such a system may not be realized if the system is constructed merely by a combination of typical and conventional general purpose arithmetic units (general purpose computers). However, in recent years, a conception of a vector instruction has been proposed and, accordingly such a high speed system as previously mentioned can be realized, which system is economical and has high efficiency during operation. The vector instruction may be defined as an instruction which can process a great amount of data through a single instruction. In this case, most of the vector arithmetic units, in which vector instructions are executed, are basically operated under a so-called pipe line processing method. The pipe line processing method is known as a method in which sequential data are continuously supplied, one by one, a plurality of arithmetic stages connected in series with each other and, thereby, respective resultant data are obtained, one by one, continuously. Therefore, the vector arithmetic unit may be considered to be compatible with respect to a scalar arithmetic unit. The scalar arithmetic unit may be defined as a unit in which each one of the sequential data units is processed by one sequential instruction.

The information processing system, to which the present invention refers, must process, at high speed, a great amount of data and, accordingly, a data processor, being a primary part of this information processing system, should comprise both the above-mentioned scalar arithmetic unit and a vector arithmetic unit, in which these scalar and vector arithmetic units are operated under the management of an instruction controller which is commonly occupied and used by both arithmetic units. The instruction controller achieves data communications both to and from main storage which cooperates with the information processing system. In this case, since the vector arithmetic unit deals with a great amount of data, the instruction controller usually achieves said data communications not directly with the main storage, but, via a so-called vector register. The vector register is classified as a kind of cache memory, however, the vector register is different from the cache memory itself from the view point in that, first the amount of data, to be stored in the vector register, is much larger than that of the cache memory and, second, the vector register is recognizable addressable by programs.

In the above mentioned information processing system, various kinds of programs are set up in accordance with a variety of calculations to be obtained and thus both first program steps and second program steps, are employed in a mixed state therein, where said first program steps should be processed by the scalar arithmetic unit and said second program steps should be processed by the vector arithmetic unit. These program steps for a scalar arithmetic operation and program steps for a vector arithmetic operation are executed sequentially. The time for executing these programs by the above mentioned system, is considerably shortened when compared to that of the general purpose arithmetic unit. This is because, the vector arithmetic unit is employed in this information processing system. In this case, it should be recognized that both the scalar arithmetic unit and the vector arithmetic unit exist independently from each other in the information processing system and, therefore, the time for executing the programs will further be shortened. That is, the scalar arithmetic unit and the vector arithmetic unit can process respective programs simultaneously, by extracting, from the sequential programs, program steps for the scalar arithmetic operation and program steps for the vector arithmetic operation separately. Thus, a so-called parallel processing mode can be performed. As a result, the time for executing the above mentioned programs can be considerably shortened.

However, a certain problem resides in the aforesaid parallel processing mode. The problem is that, although the program steps for the scalar arithmetic operation and the program steps for the vector arithmetic operation are executed separately from each other, there may be a possibility of producing some conflict, regarding instruction operands, between the scalar program steps and the vector program steps. If such conflict is left as it is, there may be a problem in that the desired correct resultant data cannot be expected. In order to solve this problem, the inventors of the present invention have tried the following experiment. First, a control register is incorporated in the information processing system. The control register stores information which determines whether or not the parallel processing mode can be performed. In this case, operation end information is added to the end of the sequential vector arithmetic programs which specify each program step for executing the vector arithmetic operation. When the operation end information is produced, the information, stored in the control register, is checked to determine whether or not the parallel processing mode can still be performed. If the information indicates that the parallel processing can still be continued, the next vector arithmetic operation will start. However, if the information in the control register indicates that the parallel processing mode must not be performed, the next vector arithmetic operation will not start until an allowance for starting the same is supplied.

However, the above mentioned inventor's experiment did not attain success. The reason for this is that, since very complicated processes are required for achieving a write operation of information to the control register and also rewriting the information therein, the processing speed of the information processing system is considerably reduced.

SUMMARY OF THE INVENTION

An object of the present invention is, therefore, to provide an information processing system, which is operating under a parallel processing mode, in which, however, no conflict between scalar and vector arithmetic instruction operands is generated. In addition, the processing system is not directly controlled by information in a control register and, accordingly processing speed of the system is not reduced. Further, the present invention provides an information processing system, in which an occurrence of a potential conflict between the instruction operands can be specified by a program when a plurality of arithmetic units are executed independently from each other, regardless of the order of the executions. The instructions being represented by sequential program steps, irrespective of scalar arithmetic instruction or vector arithmetic instructions and, accordingly the parallel processing mode, in which the conflict between the instruction operands is avoided at a high speed, can be performed in the processing system.

According to the present invention, at least one of newly employed particular instructions is inserted, in advance, in sequential scalar and vector arithmetic instructions and the execution order of the programs, subjected to the above mentioned scalar and vector arithmetic instructions, are arranged to be in a serial sequence or parallel sequence, according to said particular instruction or particular instructions.

BRIEF DESCRIPTION OF THE DRAWINGS

FIG. 11 depicts one example of a sequence of a vector arithmetic operation which are achieved by utilizing an identification number (ID) according to the present invention;

FIG. 12 is a block diagram illustrating one example of a control circuit which can execute the sequential operation depicted in FIG. 11.

DESCRIPTION OF THE PREFERRED EMBODIMENTS

The present invention will become more apparent from the detailed description of the preferred embodiments presented below, with reference to the accompanying drawing.

Figure 1:
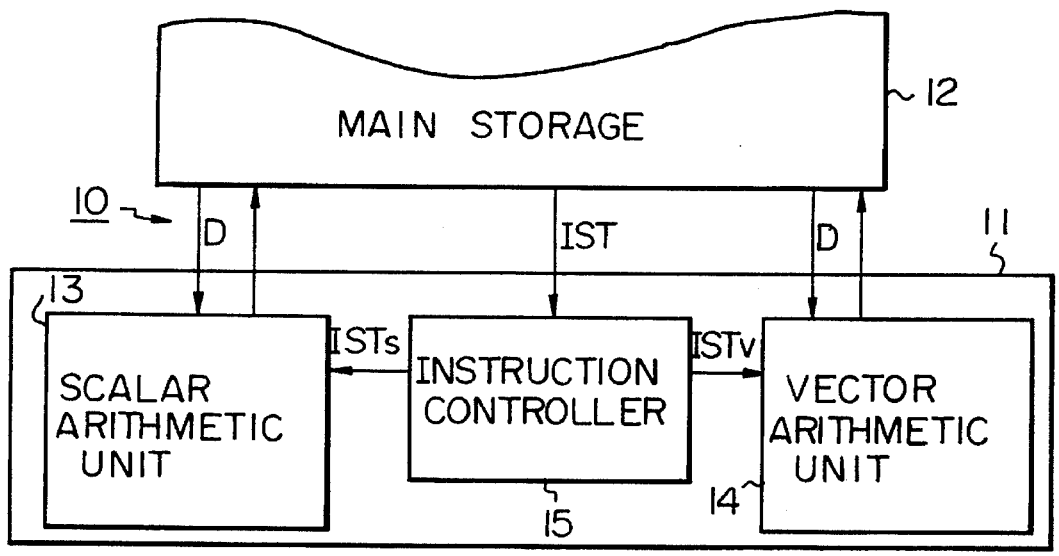
FIG. 1 is a block diagram of a typical information processing system to which the present invention is applied.

FIG. 1 is a block diagram of a typical information processing system to which the present invention is applied. In this figure, the reference numeral 10 represents an information processing system comprising a data processor 11 and main storage 12. In the data processor 11, a scalar arithmetic unit 13, a vector arithmetic unit 14 and an instruction controller 15 are located. The instruction controller 15 functions to fetch an instruction IST from the main storage 12 and decodes the instruction. The decoded instruction is distributed to the scalar arithmetic unit 13 or the vector arithmetic unit 14 selectively. When the scalar arithmetic unit 13 receives a scalar arithmetic instruction $IST_s$ from the instruction controller 15, the scalar unit 13 starts executing a predetermined operation by communicating data D between the main storage 12 and the scalar unit 13. When the vector arithmetic unit 14 receives a vector arithmetic instruction $IST_v$ from the instruction controller 15, the vector unit 14 starts executing a predetermined operation by communicating data D between the main storage 12 and the vector unit 14. Whether the scalar arithmetic instruction or the vector arithmetic instruction is generated, can be distinguished by checking the instruction code thereof.

The scalar operation to be achieved by the scalar arithmetic unit 13 are represented by the following simple expressions.

$$a+b \rightarrow c$$

$$a \times b \rightarrow c$$

While the vector operation to be achieved by the vector arithmetic unit 14 are represented by the following simple expressions.

$$\dot{A}+\dot{B} \rightarrow \dot{C}$$

$$\dot{A} \times \dot{B} \rightarrow \dot{C}$$

where, $$\text{the vector data } \dot{A} \text{ is expressed by } \dot{A} = \begin{pmatrix} a11, & a12 \ldots & a1m \\ a21 & & \cdot \\ \cdot & & \cdot \\ \cdot & & \cdot \\ \cdot & & \cdot \\ an1 & \ldots & anm \end{pmatrix}$$

$$\text{the vector data } \dot{B} \text{ is expressed by } \dot{B} = \begin{pmatrix} b11, & b12 \ldots & b1m \\ b21 & & \cdot \\ \cdot & & \cdot \\ \cdot & & \cdot \\ \cdot & & \cdot \\ bn1 & \ldots & bnm \end{pmatrix}$$

$$\text{the vector data } \dot{C} \text{ is expressed by } \dot{C} = \begin{pmatrix} c11, & c12 \ldots & c1m \\ c21 & & \cdot \\ \cdot & & \cdot \\ \cdot & & \cdot \\ \cdot & & \cdot \\ cn1 & \ldots & cnm \end{pmatrix}.$$

Figure 2:
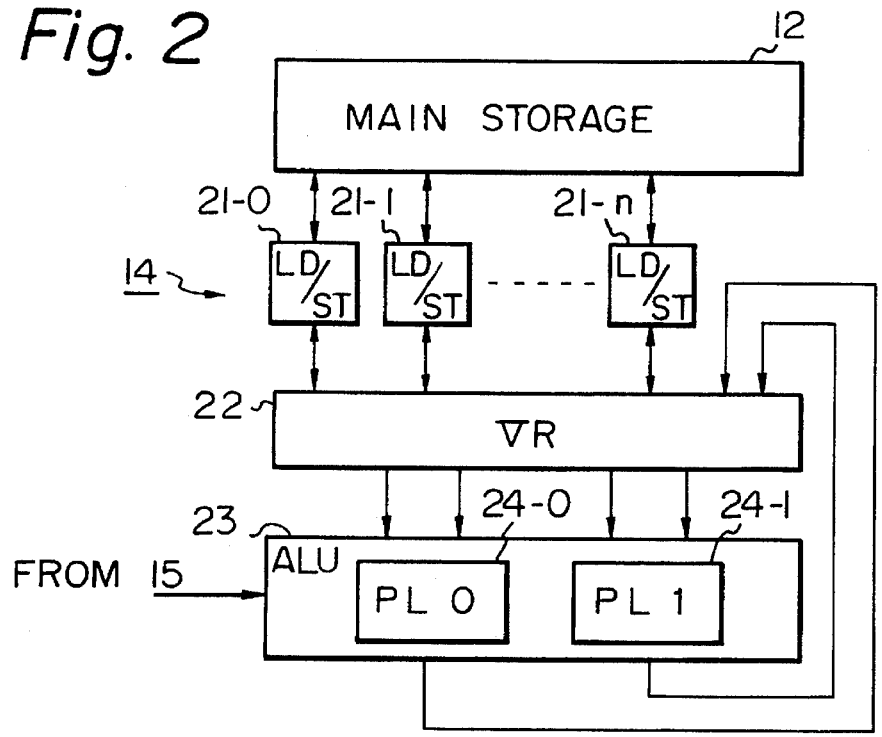
FIG. 2 illustrates one example of a vector arithmetic unit 14 shown in FIG. 1.

One example of the vector arithmetic unit 14 shown in FIG. 1, will be mentioned with reference to FIG. 2.

FIG. 2 illustrates one example of the vector unit 14 in FIG. 1. In FIG. 2, the main storage 12 is the same as that of FIG. 1. The reference numerals 21-0, 21-1, ..., 21-n represent a plurality of load/store units (LD/ST), the reference numeral 22 represents a vector register (VR), the reference numeral 23 represents a vector instruction arithmetic unit. The vector instruction arithmetic unit (ALU) 23 includes therein a plurality of pipe line processors, in this figure, two pipe line processors (PL0 and PL1) 24-0 and 24-1.

Each of the load/store units 21-0~21-n independently loads data from the main storage 12 into vector register 22 or stores data from the vector register 22 in the main storage 12. The vector arithmetic unit 23 fetches data, stored in the vector register 22, and executes an arithmetic operation with respect to the data, and the resultant data is stored in the vector register 22. Thus, the data, to be processed in the vector instruction arithmetic unit 23, is always stored or secured in the vector register 22 and, accordingly, from this point of view, the vector register 22 is analogous to the well-known cache memory. However, the vector register 22 deals with a great amount of data, when compared with that of the cache memory, for example, a capacity of one vector register is comparable with several hundred times a block size defined by the cache memory. Also although the cache memory is not recognizable by programs, however, the vector register is recognizable by programs. It should be noted that FIG. 2 illustrates only one example of the vector arithmetic unit 14 (FIG. 1) and, therefore, another example of such vector arithmetic unit is also known, such as seen in "The CRAY-1 computer System" refer to Communications of the ACM, January 1978, Volume 21, Number 1, Page 66, by Richard M. Russel of Cray Research, Inc.

Figure 3A:
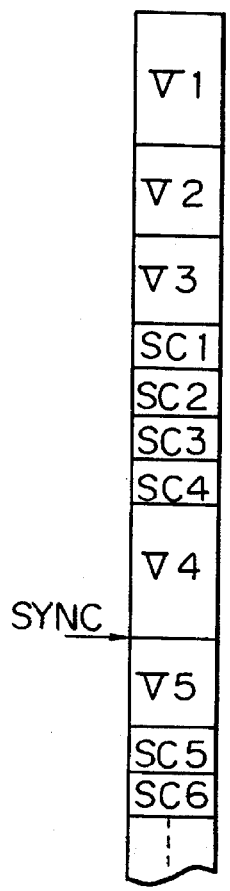
FIG. 3A depicts a flow chart of a typical data processing mode performed in an information processing system 10 of FIG. 1.

As previously explained, the information processing system 10 can process, at high speed, a great amount of data, by utilizing both the scalar arithmetic unit 13 and the vector arithmetic unit 14. FIG. 3A depicts a flow chart of a typical data processing mode performed in the information processing system 10 of FIG. 1. In FIG. 3A, the symbol s V1, V2, V3 . .. indicate, respectively first, second, third vector arithmetic instructions, while the symbols SC1, SC2, SC3 ... indicate, respectively first, second, third scalar arithmetic instructions. The instruction controller 15 of FIG. 1 ordinarily produces these instructions sequentially one by one.

However, since there exists two types of arithmetic units operating independently of each other in the system 10, as shown in FIG. 1, that is, the scalar arithmetic unit 13 for executing programs subjected to the scalar arithmetic instructions, and the vector arithmetic unit 14 for executing programs subjected to the vector arithmetic instructions, the time for processing the programs may be considerably shortened when the vector arithmetic instructions V1, V2, V3 ... and the scalar arithmetic instructions SC1, SC2, SC3 are executed parallel at the same time, that is when the parallel processing mode is performed in the system.

Figure 3B:
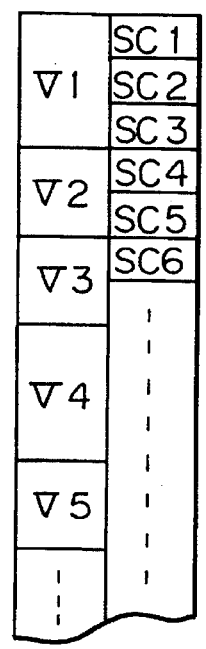
FIG. 3B depicts a flow chart of a parallel processing mode for processing data in the information processing system 10 of FIG. 1.

FIG. 3B depicts a flow chart of the parallel processing mode for processing data in the information processing system 10 of FIG. 1. As seen from this figure, the vector arithmetic instructions V1, V2, V3 ... and the scalar arithmetic instructions SC1, SC2, SC3 are executed in parallel with each other. Consequently, the time for executing the instructions can be considerably shortened when compared with that of the serial processing mode shown in FIG. 3A.

However, on the other hand, the parallel processing mode of FIG. 3B produces the aforesaid problem. The reason for producing the problem is that, although there are tight relationships between the vector arithmetic instructions and the scalar arithmetic instructions, such tight relationships are not taken into consideration during execution of these instructions. This will be clarified by taking a simple relationship as one example, providing that the information processing system 10 of FIG. 1 processes the following arithmetic expression $$\{(\dot{A}+\dot{B})+(c+d)\}\times\dot{E}+(f+g)$$

based on vector data $\dot{A}$ and $\dot{B}$ and scalar data c, d, f, and g, the arithmetic operations for $(\dot{A}+\dot{B})$, (c+d) and (f+g) can be achieved independently from each other under the parallel processing mode. However, it should be noted that when the arithmetic operation for $\{(\dot{A}+\dot{B})+(c+d)\}\times\dot{E}$ is commenced, the arithmetic operations for both $(\dot{A}+\dot{B})$ and (c+d) must have already been completed, which fact indicates the aforesaid tight relationships between the vector and scalar arithmetic instructions.

With reference to FIG. 3A, provided that both the vector arithmetic instructions V1~V4 and the scalar arithmetic instructions SC1~SC4 are to be executed before the vector arithmetic instruction commences executing (refer to the arrow SYNC: Synchronism), according to the prior art, the vector arithmetic unit 14 (FIG. 1) is inhibited from being operated under the parallel processing mode after the time when the vector unit 14 finishes executing the vector arithmetic instruction V4, and then the unit 14 starts operating under the parallel processing mode again, after the execution of the vector arithmetic instruction V5 is finished. However, as previously mentioned, such control for the vector unit 14 as mentioned above induces a defect in that very complicated processes are required for achieving a write operation of the information into a control register and also rewriting the information therein and, accordingly the processing speed of the information processing system is considerably reduced.

Figure 3C:
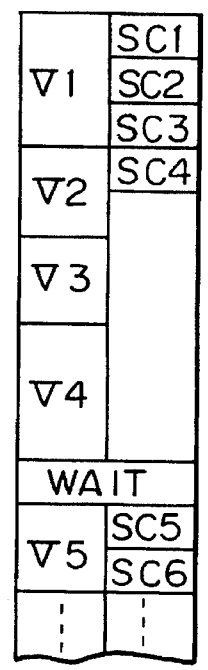
FIG. 3C depicts one example of a flow chart of a processing mode, according to the present invention, for processing data in the information processing system 10 of FIG. 1.

According to the information processing system of the present invention, a particular instruction is inserted by a compeller or a programer at the position indicated by the aforesaid arrow SYNC of FIG. 3A. This particular instruction will be referred to hereinafter as a wait instruction (WAIT). FIG. 3C depicts one example of a flow chart of a parallel processing mode, according to the present invention, for processing data in the information processing system 10 of FIG. 1. In this figure, the step WAIT for executing the wait instruction corresponds to the above mentioned particular instruction. When the wait instruction is provided, even though the information processing system 10 is allowed by the control register to operate under the parallel processing mode, a synchronization, between the execution sequence of the scalar arithmetic unit 13 and the execution sequence of the vector arithmetic unit 14, is performed because of the provision of said wait instruction. The instruction controller 15 (FIG. 1) fetches, from the main storage 12 (FIG. 1), sequential instructions, which contain therein the wait instruction at the position corresponding to the arrow SYNC of FIG. 3A, and then supplies, to the vector arithmetic unit 14, one set of vector arithmetic instructions (V1~V4), and to the scalar arithmetic unit 13, the scalar arithmetic instructions (SC1~SC4). When the scalar arithmetic unit 13 finishes executing the corresponding scalar instructions SC1~SC4 and sends a finish notification to the instruction controller 15, the next scalar instructions SC5, SC6 ... (until the provision of the next wait instruction) are newly provided. Similarly, when the vector arithmetic unit 14 finishes executing the corresponding vector arithmetic instructions V1~V4 and sends a finish notification to the instruction controller 15, the next vector instructions V5 ... (until the provision of the next wait instruction) are newly provided.

Figure 4A:
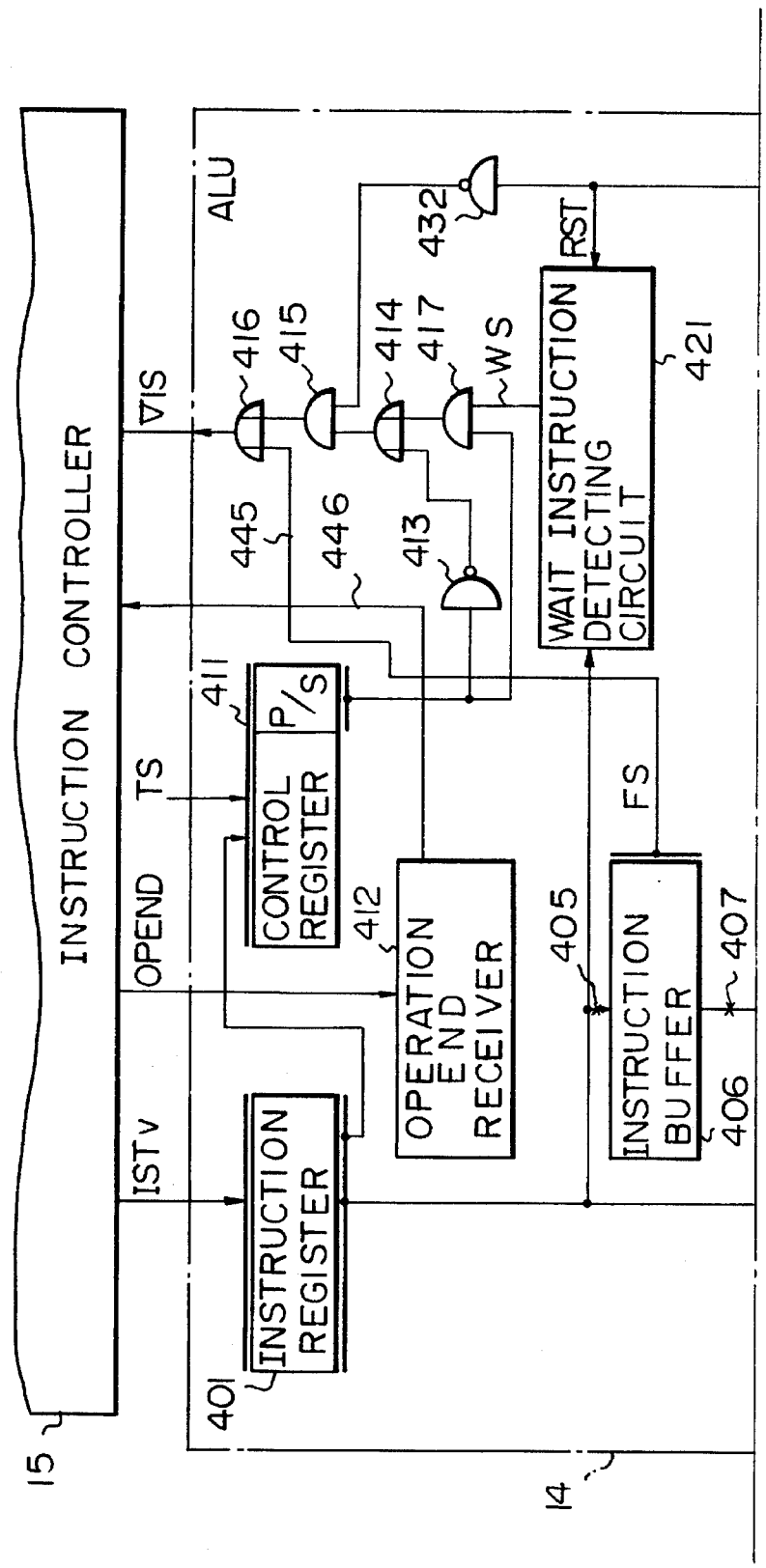
FIG. 4 is, including FIGS. 4A and 4B, a block diagram illustrating an embodiment of the vector arithmetic unit 14, according to the present invention.
Figure 4B:
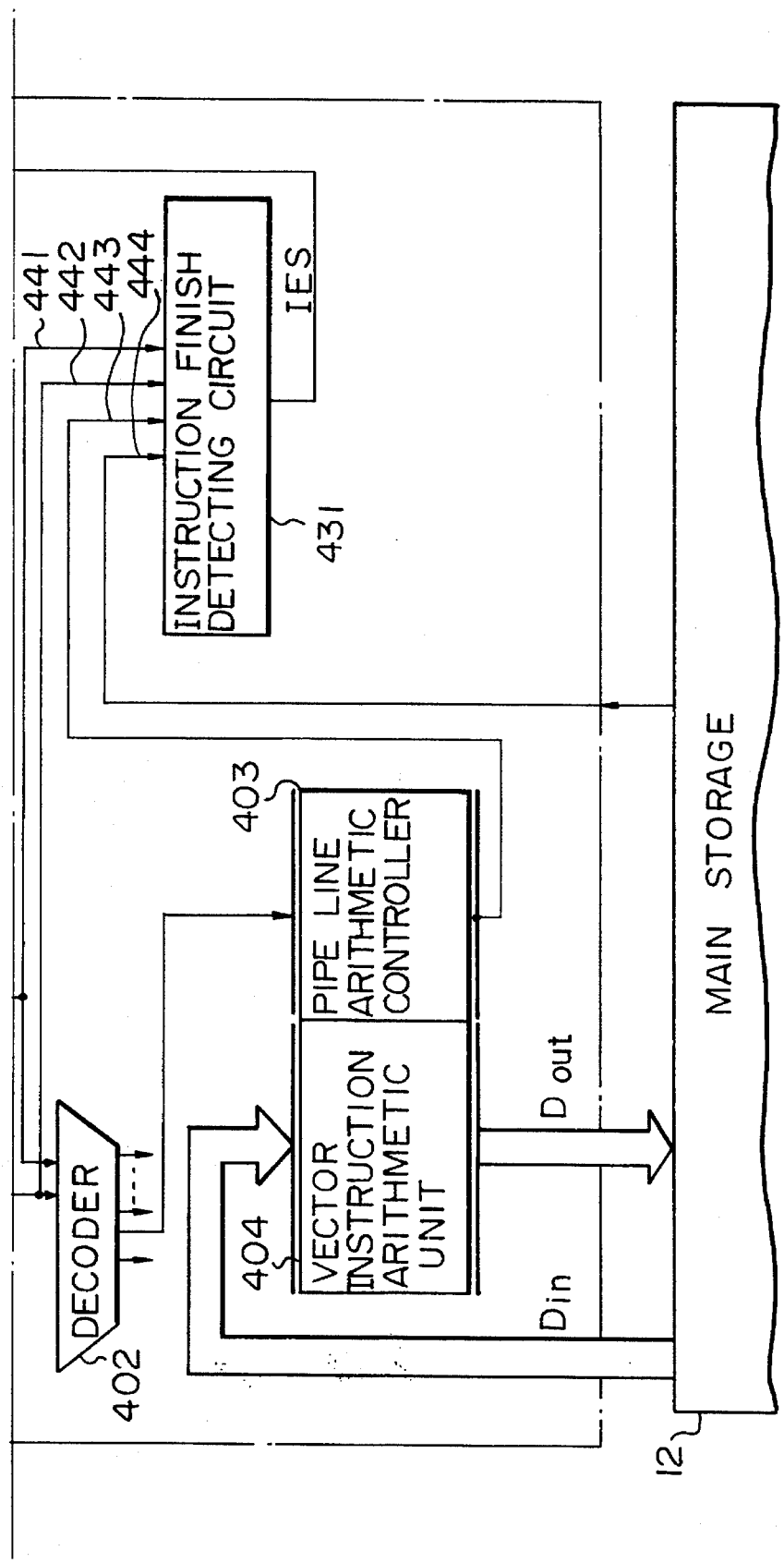

FIG. 4 is a block diagram illustrating an embodiment of the vector arithmetic unit 14 in FIG. 1, according to the present invention. In this figure, the main storage 12, the vector arithmetic unit 14 and the instruction controller 15 have already been explained. The operation is as follows. First, the vector instructions ($IST_V$) from the instruction controller 15 are stored in an instruction register 401 sequentially. These instructions are transferred to a decoder 402 and decoded thereby. The decoded instructions are executed in the pipe line processor. The pipe line processor corresponds to one of the aforesaid pipe line processors (24-0 and 24-1) in FIG. 2 and actually comprises, as shown in FIG. 4, a pipe line arithmetic controller 403 and a vector instruction arithmetic unit 404. The vector instruction arithmetic unit 404 fetches, from the main storage 12, an input data $D_{in}$, under the control of the pipe line arithmetic controller 403, and an output data $D_{out}$, as the resultant data, is stored again in the main storage 12.

When the instruction register 401 produces the vector instructions V1, V2, V3 ... continuously one after another, the pipe line processor (403 and 404) often may be unable to process all of these instructions as they arrive. Accordingly, the vector instructions, produced continuously one after another, are temporarily stored, via an input gate 405, in an instruction buffer 406. The vector instructions, once stored in the buffer 406, wait, for a while, till the time to be dispatched therefrom and travels, via an output gate 407, to the decoder 402.

Figure 5:
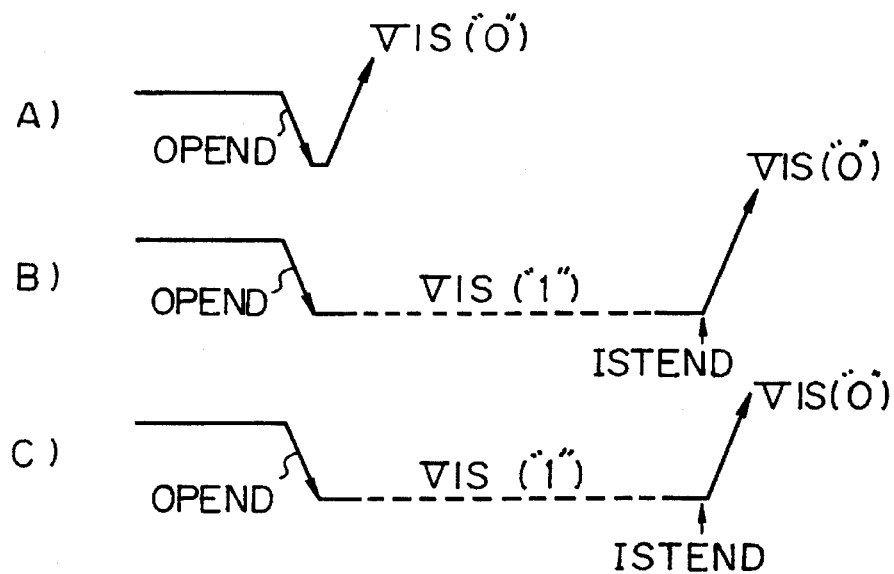
FIG. 5 depicts a sequence diagram used for explaining the circuit of FIG. 4.

The aforesaid control register is illustrated, in FIG. 4, as a control register 411 at an upper center portion of the drawing. The control register 411 supervises the contents of the instruction register 401 and makes its P/S bit logic "1" or "0". The control register 411 receives an external test signal TS when a diagnostic test is to be achieved with respect to the vector arithmetic unit 14, however, this signal TS is not relevant to the present invention. Regarding the P/S bit, the symbol P denotes the parallel processing mode and the symbol S denotes the serial processing mode. If the vector arithmetic unit 14 is left in a state where the vector unit 14 can be operated under the parallel processing mode, the bit P becomes logic "1" which indicates that the parallel processing mode is allowed. In this case, the instruction controller 15 should produce or output one set of vector arithmetic instructions (V1–V4) (refer to FIG. 3B) (accordingly no wait instruction is contained therein). When the instruction controller 15 finishes producing one whole set of the vector arithmetic instructions, the instruction controller 15 sends an operation end information signal OPEND to an operation end receiver 412 after the controller 15 finishes transferring one whole set of said vector arithmetic instructions. The operation end information indicates a transmission is finished for one set of the vector arithmetic instructions. The vector arithmetic unit 14 changes the logic of a vector instruction inhibit signal VIS, indicating that vector instructions must not be provided, to the vector arithmetic unit 14, to the logic "1", when the vector unit 14 detects the following three conditions; 1. the operation end information OPEND is received in the receiver 412, 2. the P/S bit is logic "1", (indicating that the parallel processing mode is allowed), and 3. no wait instruction exists. The signal VIS having logic "0" indicates that the instruction controller 15 is allowed to still continue providing the vector instructions to the vector arithmetic unit 14. However, the logic "1" thereof indicates that the instruction controller 15 is not allowed to continue providing the vector instructions $IST_V$ thereto. FIG. 5 depicts a sequence diagram, used for explaining the circuit of FIG. 4. The sequence, depicted in row A) of FIG. 5, exists when the aforesaid conditions are detected, that is the information OPEND is received, the P/S bit is logic, "1" (the parallel processing mode is allowed) and no wait instruction exists. Thus, the row A) represents the parallel processing mode. In this mode, the logic "1" of the P/S bit (the parallel processing mode is allowed) is transformed to be logic "0" by way of a NAND gate 413, (FIG. 14) and this logic "0" is finally processed to be logic "0" of the aforesaid signal VIS, by way of an OR gate 414, an AND gate 415 and an OR gate 416. In this case, the other inputs of respective AND gates 415 and 417 receive logic "0" signals (mentioned hereinafter). When the instruction controller 15 receives the signal VIS having logic "0" the controller 15 provides the next set as vector arithmetic instructions $IST_V$ to the vector arithmetic unit 14.

However, if the wait instruction (WAIT) is provided after the vector arithmetic instruction V4, but before the occurrence of the operation end information OPEND to be followed after vector arithmetic instruction V4 (refer to FIG. 3C), the signal VIS changes, after a while, from logic "1" (the vector instructions must not be provided) to logic "0" (the vector instructions are allowed to be provided). Therefore, row C) represents a parallel processing— wait mode. The signal VIS changes from logic "1" to logic "0" at an INSTEND which indicates the time when one set of the vector arithmetic instructions is finished being executed. When such wait instruction is provided, a wait instruction detecting circuit 421 detects this wait instruction. Then the wait detecting circuit 421 applies a wait signal WS having logic "1" to the AND gate 417. At this time, since the P/S bit of the control register 411 is logic "1" (the parallel processing mode is allowed), the AND gate 417 opens and the output of logic "1" therefrom changes, via the OR gate 414, the AND gate 415 and the OR gate 416, to the signal VIS having logic "1" (the vector instructions must not be provided). In this case, said AND gate 415 receives output of logic "1" from a NAND gate 432 until the execution of the vector arithmetic instructions finishes (ISTEND). Thereafter, when the execution of the previously provided vector arithmetic instructions (V1~V4) is finished, an instruction finish detecting circuit 431 produces an instruction finish or end signal IES having logic "1". The instruction end signal IES changes the output of the AND gate 415 to logic "0" through the NAND gate 432, and then the signal VIS having logic "0" (the next vector arithmetic instructions are allowed to be provided) is applied, via the OR gate 416, to the instruction controller 15. Thus, the next processes are allowed to start. The instruction finish detecting circuit 431 produces the instruction finish signal IES having logic "1" when the following four conditions are satisfied; 1. the instruction register 401 is empty (indicated on line 442), 2. the instruction buffer 406 is empty (indicated on line 441), 3. the process to be achieved in the pipe line processors (403, 404) has finished (indicated on line 443) and 4. the resultant data $D_{out}$ from the pipe line processor (403, 404) has been stored in the main storage 12 (indicated on line 444). The signal IES is applied, on the other hand, to the wait instruction detecting circuit 421 for resetting (RST) the same and, thereby, the wait detecting circuit 421 can receive a newly provided wait instruction.

Thus, the instruction controller 15 acknowledges that the vector arithmetic instruction V5, following after the wait instruction (WAIT) (refer to FIG. 3C), can be provided to the vector arithmetic unit 14. However, the controller 15 does not provide the vector arithmetic instruction V5 immediately. If the logic of the signal VIS in FIG. 4 is "1", the logic of the AND gate 417 should be "1" and this fact indicates that both the parallel processing mode and the wait instruction exist. Accordingly, the aforesaid synchronization, between the execution sequence of the vector arithmetic instructions V1~V4 and the execution sequence of the scalar arithmetic instructions SC1~SC4 (refer to FIG. 3C), must be performed. Therefore, the instruction controller 15 does not also provide the scalar arithmetic instruction SC5, following after the wait instruction (WAIT) (refer to FIG. 3C). However, the instruction controller 15 can provide the instruction V5 ... and SC5 ..., respectively to the vector arithmetic unit 14 and the scalar arithmetic unit 13, if the controller 15 acknowledges that the scalar arithmetic unit 13 (FIG. 1) has finished executing one set of the scalar arithmetic instructions SC1~SC4, preceding before the wait instruction (WAIT), and also the logic of the signal VIS changes to "0" (the vector arithmetic instructions can be provided). It should be understood that, although the scalar arithmetic unit 13 also contains therein a circuit being identical to the wait instruction detecting circuit 421, such circuit is not illustrated in the drawing. Generally, since the time required for the vector arithmetic operations is longer than the time required for the scalar arithmetic operations, it is sufficient for the instruction controller 15 to provide the instructions, following after the wait instruction, after the controller 15 acknowledges that the logic of the signal VIS, created in the vector system, changes to logic "0".

When the parallel/serial P/S bit of the control register 411 in FIG. 4 is logic "0", this means that the parallel processing mode (refer to FIG. 3B) must be inhibited, while the serial processing mode (refer to FIG. 3A) is be employed. In this case, the AND gate 417 of FIG. 4 is always closed, regardless of the existence or non-existence of the wait instruction signal WS. On the other hand, the output of logic "1" from the NAND gate 413 changes, via the OR gate 414, the AND gate 415 and the OR gate 416, the logic of the signal VIS to logic "1" (the vector arithmetic instructions can be provided). When the operation end receiver 412 receives the operation end information OPEND from the instruction controller 15 (this information will be returned to the gate 415 via a line 446), and when the logic "1" of the signal VIS is changed, via the NAND gate 432 cooperating with the instruction finish signal IES, the NAND gate 432, the AND gate 415 and the OR gate 416, to the logic "0" the instruction controller 15 provides the following instructions (refer to row B) of FIG. 5). That is, row B) represents the serial processing mode. The OR gate 416 also receives a buffer full signal FS (having logic "1") from the instruction buffer 406 via a line 445. This is because, if the instruction buffer 406 is full of instructions, other following instructions from the instruction controller 15 are not presently acceptable.

Figure 6:
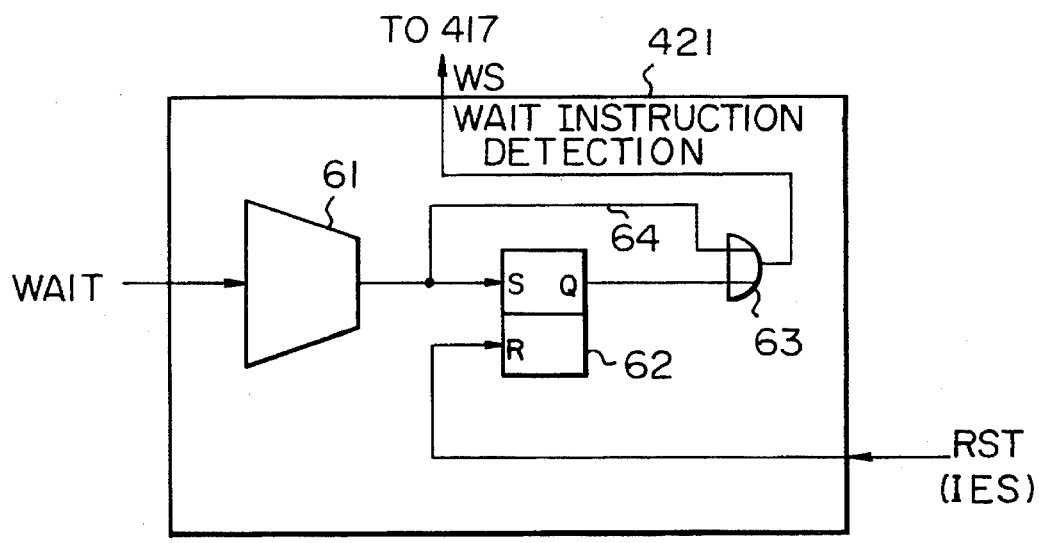
FIG. 6 is a block diagram illustrating one example of a wait instruction detecting circuit 421 of FIG. 4.

FIG. 6 is a block diagram illustrating one example of the wait instruction detecting circuit 421 of FIG. 4A. In FIG. 6, the wait detecting circuit 421 receives the wait instruction (WAIT) from the instruction register 401 (FIG. 4A, receives the reset signal RST (identical to the instruction finish signal IES) from the instruction finish detecting circuit 431 and then produces the wait signal WS (FIG. 4) to be applied to the AND gate 417 (FIG. 4). The received wait instruction WAIT is decoded by a wait instruction decoder 61 and the output therefrom sets a flip-flop 62, the Q output "1" therefrom is produced, as the signal WS, from an OR gate 63. Since the wait instruction has a duration corresponding to one clock, pulse an initial wait instruction signal WS can be directly produced, via a line 64, from the OR gate, however, the same wait instruction signal, WS was appearing after the second clock, pulse must be sustained by the flip-flop 62.

Thus, even though the control register 411 specifies either the parallel processing mode or the serial processing mode, once the particular instruction, that is the wait instruction (WAIT), is incorporated within the instructions, a synchronization, between the execution sequence regarding the scalar arithmetic unit 13 and the execution sequence regarding the vector arithmetic unit, 14 is established at the provision of said wait instruction (WAIT). Thus, the scalar and vector arithmetic operations, such as for example an expression of $\{(\dot{A}+\dot{B})+(c+d)\times\dot{E}+(f+g)\}$, can be processed under the parallel processing-mode without inducing any logical conflict.

Figure 7:
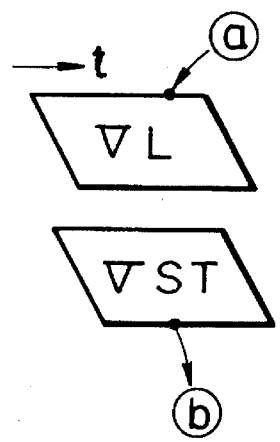
FIG. 7 illustrates the operation to be achieved by each of load/store units 210 –21n.
Figure 8:
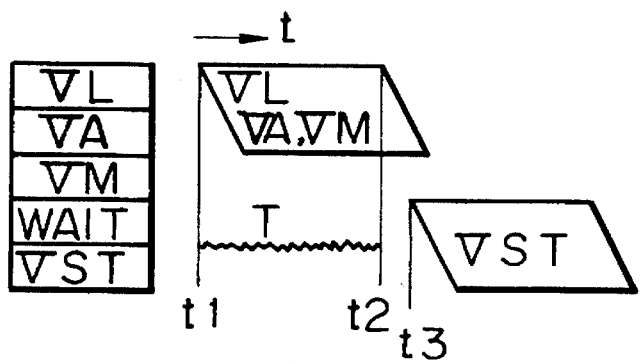
FIG. 8 depicts a sequence of an operation mode, in which a wait instruction according to the present invention is used, when, in the load/store unit, the address of the load operation coincides with the address of the store operation.

The major part of the information processing system, according to the present invention, has been explained hereinbefore, however, in actual operation, it is not sufficient for the system to employ such wait instruction only, when further fine control is required in the system. The fine control will be explained hereinafter. It is inconvenient to explain such fine control with reference to FIG. 1 and, accordingly the following explanation will be made with reference to FIG. 2. FIG. 2 illustrates one example of the vector arithmetic unit 14 in FIG. 1, and the explanation thereof has already been made. In FIG. 2, when the load/store operations are achieved in the load/store units 21-0~21-n, these load/store operations are advanced as seen in FIG. 7. FIG. 7 schematically illustrates operations to be achieved by these load/store units 21-0~21-n. In this figure, the symbol VL denotes that the load/store unit loads (fetches) data from the main storage 12 (FIG. 2), which is called as a vector load. The symbol VST denotes that the load/store unit stores data in the main storage 12, which is called as a vector store. The symbol t indicates an elapsed time. The vector load VL is achieved at an address â in the main storage 12 and the vector store VST is achieved at an address b̂ in the main storage 12. However, there often exists a case where the address â is, by chance, the same as the address b̂. In such case, if a predetermined processing sequence, that is, first the data of the address â is loaded and next the resultant data regarding loaded data is stored at the address b̂, is not maintained, a logical conflict is necessarily produced. It is very useful to employ the above mentioned wait instruction so as to avoid such a logical conflict, which will be clarified with reference to FIG. 8. FIG. 8 schematically depicts a sequence for an operation mode, in which the wait instruction is used, when, in the load/store unit, the address of the load operation coincides with the address of the store operation. The meanings of the symbols VL, VST, WAIT in this figure, have already been explained. The symbols VA and VM denote the variety of the vector arithmetic operation such as, for example a vector add (+) VA and a vector multiply (X), VM respectively. In this figure, first the vector load VL is achieved and then the wait instruction WAIT is executed after the vector add VA and the vector multiply VM have been executed. Therefore, the vector store VST is operated after these vector operations VL, VA and VM have been finished. That is, the vector operations VL, VA and VM are achieved during the time from t1 to t2 and then the vector store VST starts operating at the time t3. Therefore, the duration between the time t1 and t2 constitutes a waiting time. Thus, the aforesaid logical conflict cannot be produced.

Figure 9:
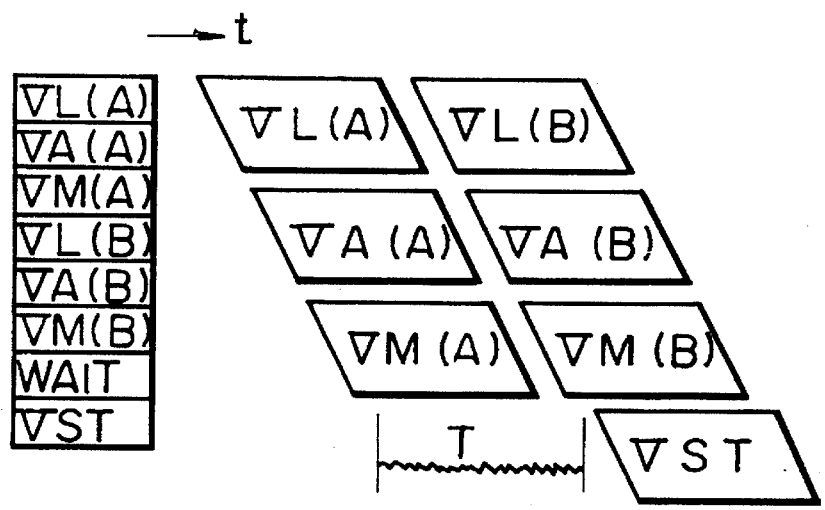
FIG. 9 depicts a sequence of a case where a load/store operation regarding vector operation A overlaps with a load/store operation regarding vector operation B.

However, a disadvantageous problem may be produced if an occurrence of a first case overlaps with an occurrence of a second case, wherein the first case is where the load/store unit 21-1 (FIG. 2) executes the load/store operation regarding a vector arithmetic operation A, while, the second case is where the load/store unit 21-n (FIG. 2) executes the load/store operation regarding a vector arithmetic operation B. This will further be clarified with reference to FIG. 9. FIG. 9 schematically depicts a sequence for a case where the load/store operation regarding the vector operation A conflicts with the load/store operation regarding the vector operation B. In this figure, the symbols VL(A), VA(A) and VM(A) denote the aforesaid operations VL, VA and VM regarding the vector arithmetic operation A, while, symbols VL(B), VA(B) and VM(B) denote the aforesaid operations VL, VA and VM regarding the vector arithmetic operation B. In this case, the operational timing of the vector store VST is shifted rightward in the drawing with respect to the elapsed time t. In other words, the operational timing of the vector store VST is retarded. This is because the vector store VST can start operating only after all the vector operations VL(A), VA(A), VM(A), VL(B), VA(B) and VM(B) are completed. In such case, as mentioned above, if the vector store VST is to be operated with respect only to the vector arithmetic operation A, the waiting time T shown in FIG. 9 is unnecessarily long. That is, it may not be necessary for the vector operations, regarding the vector arithmetic operation B, VL(B), VA(B) and VM(B) to retard the operational timing of the vector store VST till all of these vector operations are completed.

Figure 10:
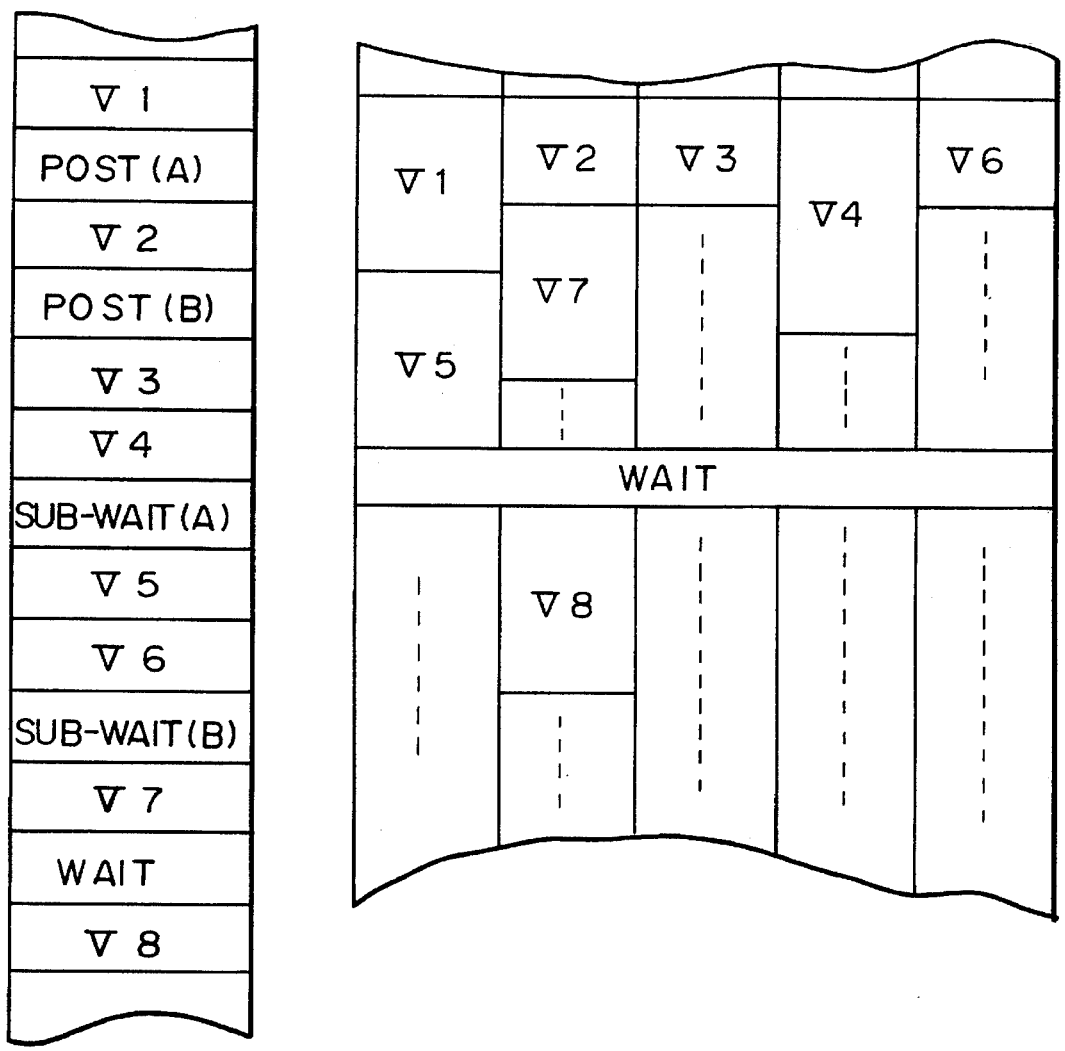
FIG. 10 depicts a sequence used to explain both a serialized-starting instruction (POST) and a serialized-releasing instruction (SUB-WAIT)

Under such circumstance, in the present invention, a sub-wait instruction SUB-WAIT is also employed in the information processing system, other than the aforesaid wait instruction WAIT. The sub-wait instruction is used together with a post instruction POST, as one body. The post instruction POST is defined as a serialized-starting instruction, while, the sub-wait instruction is defined as a serialized-releasing instruction. These instructions will be explained with reference to the drawing. FIG. 10 depicts a sequence, used for explaining both the serialized-starting instruction (POST) and the serialized-releasing instruction (SUB-WAIT). It should be understood that, in FIG. 10, the vector operations are expressed in more general form, compared with those of FIG. 9. To be specific, when, as shown in the left column of FIG. 10, vector arithmetic instructions V1, V2, V3 ... are provided and the serialized-starting instruction POST (A) and the serialized-releasing instruction SUB-WAIT (A), both related to the vector arithmetic operation A, are inserted, respectively after the vector arithmetic instruction V1 and before the vector arithmetic instruction V5; and when the serialized-starting instruction (B) and the serialized-releasing instruction SUB-WAIT (B), both regarding the vector arithmetic operation B, are inserted, if necessary, respectively after a vector arithmetic instruction V2 and before a vector arithmetic instruction V7; the above-mentioned sequential vector arithmetic instructions are executed in the serial processing and parallel processing modes, as shown in the right column of FIG. 10. These instructions are all completely executed before the wait instruction WAIT is provided and at the same time other instructions V3, V4 and V6 are also completely executed under the parallel processing mode by utilizing respective idle vector arithmetic units. Accordingly, returning to FIG. 9, it will be recognized that, for the purpose of shortening the waiting time T, the serialized-starting instruction (POST) should be inserted after the operation VM(A) and the serialized-releasing instruction (SUB-WAIT) should be inserted before the operation VST, so as to move the operational timing of the original wait instruction WAIT after that of the operation VST.

In FIG. 10, only two varieties of the vector arithmetic operations, that is (A) and (B), are demonstrated. However, in actual use, many varieties of the vector arithmetic operations must often be achieved under the parallel processing mode. Therefore, it is required for these vector arithmetic operations to be distinguished from each other, by utilizing a suitable distinguishing technique. In the present invention, an identification number is employed as one of the distinguishing techniques. This identification number is hereinafter referred to as an ID number.

Using the ID number, both the serialized-starting instruction (POST) and the serialized-releasing instruction (SUB-WAIT), both having the same ID number, that is $ID_k$(k=1, 2, 3 ...), are treated as a pair of instructions. For example, in FIG. 10, if the ID number $ID_1$ is allotted to the instruction POST(A), the corresponding instruction SUB-WAIT(A) must also have the same ID number $ID_1$. It should be noted that if there is no identical or equivalent pair of instructions, other than single pair of instructions POST and SUB-WAIT, no such ID number may be needed. The operation, using the above mentioned ID numbers, will be explained. FIG. 11 depicts one example of a sequence for the vector arithmetic operation which is achieved by utilizing the ID number. In this case, it should be assumed that the following two conditions should be satisfied. The first condition is that both the vector load VL (instruction A) and the vector load VL (instruction B) must be completely executed before the execution of the vector store VST (instruction F). The second condition is, that the vector store VST (instruction C), must be completely executed before the execution of the vector load VL (instruction G). Under such conditions, the following program should be set up. That is, the serialized-starting instruction POST (1), having the ID number of $ID_1$, is inserted after the instructions A and B and the serialized-starting instruction POST (2), having the ID number of $ID_2$, is inserted after the instruction C. At the same time, the serialized-releasing instruction SUB-WAIT (1), having the ID number of $ID_1$, is inserted before the instruction F and the serialized-releasing instruction SUB-WAIT (2), having the ID number of $ID_2$, is inserted before the instruction G.

In FIG. 11, the vector load instructions and the vector store instructions are to be executed by using respective pipe line processors #1~#n. When the instruction POST (1) exists, the ID number of $ID_1$ must be allotted to the pipe line processors which should execute the vector load instructions and/or the vector store instructions which are; 1. not the vector store instructions that are not yet completely executed before the instruction POST (1), and 2. also not provided with any ID number. Also, when the instruction POST (2) exists, the ID number of $ID_2$ must be allotted to the pipe line processors which should execute the vector load instructions and/or vector store instructions which are 1. not yet completely executed before the instruction POST (2), and 2. also not provided with any ID number. The pipe line processors, to which the above mentioned ID numbers ($ID_1$, $ID_2$) are allotted, generate a busy signal during the executions of corresponding instructions. When the instruction SUB-WAIT (1) is provided, all the pipe line processors, having the ID number of $ID_1$, start executing the instruction F after the busy signal disappears. Also, when the instruction SUB-WAIT (2) is provided, all the pipe line processors, having the ID number of $ID_2$, start executing the instruction G after the corresponding busy signal disappears.

FIG. 12 is a block diagram illustrating one example of a control circuit which can execute the sequential operation depicted in FIG. 11. In this figure, the meaning of the reference numerals 12, 21-0, 21-1, ..., 21-n and 22 have already been explained. When the aforesaid serialized-starting instruction POST (1) is set in an instruction register 121, an instruction dispatch controller 124 detects the set of instructions and discriminates the same. The controller 124 sets the ID number $ID_1$ in identification registers (ID) (125-0~125-n) contained respectively in the load store units (21-0~21-n) to which the vector load instruction and the vector store instruction, both existing before the provision of the instruction POST (1), have been supplied. Thereafter, when the serialized-starting instruction POST (2) is set in the instruction register 121, the dispatch controller 124 sets, as mentioned above, the ID number $ID_2$ in the identification registers (125-0~125-n). After a time period, if the serialized-releasing instruction SUB-WAIT (1) is set in the instruction register 121, the controller 124 checks on whether or not the busy signal is generated from the load store units which have the ID number ID. If the busy signal is generated from any one of the load store units, the instruction F, to be set next in the instruction register 121, is set in an instruction-holding register 122-0 or an instruction waiting register 122-1 and the register watches and waits for a chance to output instruction F. If the busy signal disappears thereafter, the content of the instruction-holding register 122-0 or 122-1 is transferred to an instruction register 123 and set therein. If the instruction SUB-WAIT (2) is set in the instruction register 121, identical operations, as mentioned above with regard to the instruction SUB-WAIT (1), will also start.

In the above explanations, the serialized-starting instruction POST and also the serialized-releasing instruction SUB-WAIT should exist as independent instructions, however, it may also be possible to further add an identification number (ID) (or an identification code) to an instruction code itself with respect to each of the vector load instructions and the vector store instructions. However it should be noted that, with respect to the instructions for the identical vector arithmetic operation A, the same identification number (or the same identification code) must be added to each of these vector arithmetic instructions; and simultaneously such vector arithmetic instructions must be executed by the same numbered pipe line processor. Similarly, regarding the instructions for the identical vector arithmetic operation B, the same identification number (or the same identification code), which is different from that of the aforesaid vector arithmetic operation A, must be added to each of these vector arithmetic instructions (B); and simultaneously such vector arithmetic instructions must be executed by the same pipe line processor which is different from the aforesaid pipe line processor regarding the aforesaid vector arithmetic operation A.

Figure 13:
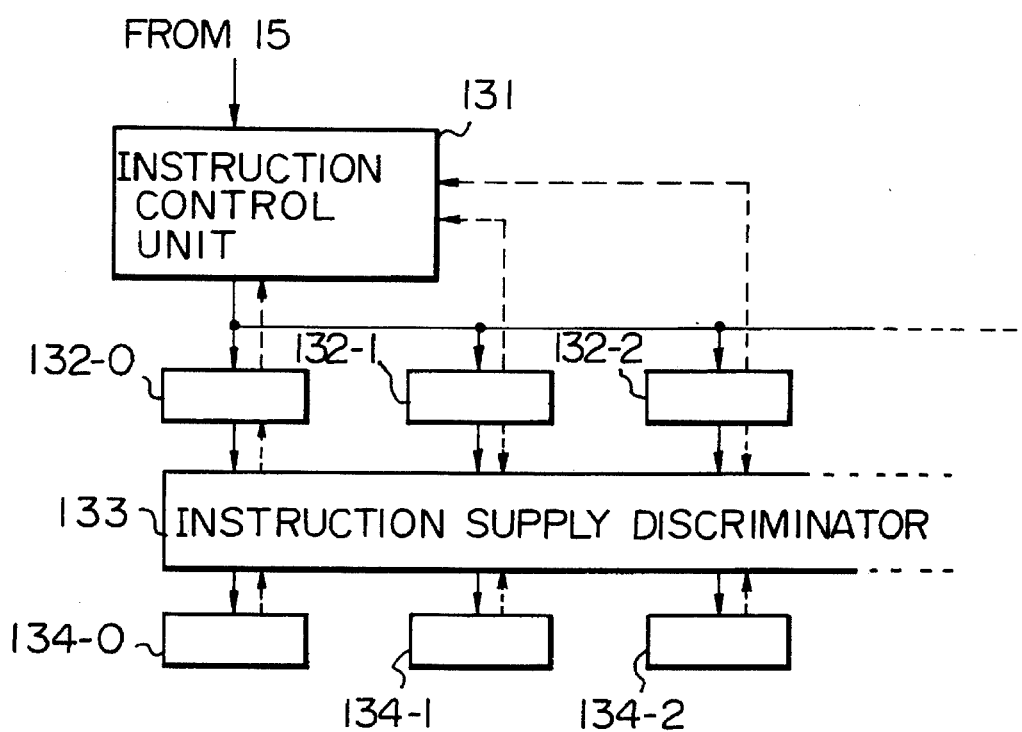
FIG. 13 is a block diagram illustrating one example of a circuit which functions to serialize vector instructions having a certain relationship with each other when the identification numbers (ID) are added to the vector instructions themselves.

FIG. 13 is a block diagram illustrating one example of a circuit which functions to serialize the vector arithmetic instructions having a certain relationship with each other when the identification numbers (ID) (identification codes) are added to the vector instructions themselves. That is, the circuit of FIG. 13 can serialize each pair of instructions, without using the aforesaid instructions POST and SUB-WAIT. In this figure, the reference numeral 131 represents an instruction control unit which receives the vector arithmetic instructions from the instruction controller 15 (FIG. 1). The vector arithmetic instruction are stored in one of idle registers among registers 132-0, 132-1, 132-2 ... which are registers for storing instructions waiting to be executed. An instruction supply discriminator 133 checks on whether or not each of the vector arithmetic units (refer to the reference numeral 404 in FIG. 4), is idle. The idle unit should execute the corresponding vector arithmetic instruction stored in one of the registers (132-0, 132-1, 132-2 . . .) for storing instructions waiting to be executed. The discriminator 133 also checks on whether or not a collision of the operand data (refer to the symbol $D_{in}$ in FIG. 4) occurs. According to the result of these checks, if the discriminator 133 determines that the corresponding vector instruction arithmetic unit is idle and, at the same time, no collision of the operand data occurs, the discriminator 133 transmits the vector arithmetic instruction to the corresponding register (134-0, 134-1, 134-2 . . .) for storing the instructions waiting to be executed. Then the corresponding vector instruction arithmetic unit starts operating according to the vector arithmetic instruction.

The operation will be clarified with reference to the following example, wherein the programs to be executed are expressed as follows.

① vector load VL(1) $\dot{A}$

② vector load VL(2) $\dot{B}$

③ vector add VA $\dot{A}+\dot{B}\rightarrow\dot{C}$

④ vector store VST(1) VR←$\dot{C}$ (VR indicates the vector register 22 of FIG. 2)

⑤ vector load VL(3) $\dot{E}$

⑥ vector load VL(4) $\dot{F}$

⑦ vector multiply VM $\dot{E}\times\dot{F}\rightarrow\dot{G}$

⑧ vector store VST(2) VR←$\dot{G}$ (Where, the symbols $\dot{A}$~$\dot{G}$ represent vector data.)

These vector instructions VL(1), VL(2), VA, VST(1), VL(3), VL(4), VM and VST(2) are, respectively, stored in the registers 132-0, 132-1, 132-2 ... , for storing the instructions waiting to be executed. First, the vector load instruction VL(1) is executed and the vector data $\dot{A}$ is fetched from the main storage 12 and written in the vector register 22 (FIG. 2). Next, the vector load VL(2) is executed and the vector data $\dot{B}$ is fetched from the main storage 12 and written in the vector register 22. After the operand data $\dot{A}$ and $\dot{B}$ have been fetched, the vector add instruction VA is executed. The resultant data thereof, that is the vector data $\dot{C}$ is written in the vector register VR or 22. Since the vector multiply instruction VM can be executed without using the vector data $\dot{C}$, this vector instruction VM can be executed in parallel with the execution of the vector add instruction. During the execution of the vector add instruction VA, the corresponding load/store unit (refer to the reference numerals 21-0~21-n in FIG. 2) is idle and, accordingly the vector load instructions VL (3) and VL(4) still continue to be executed, and the vector data $\dot{E}$ and $\dot{F}$ are fetched from the main storage and stored in the vector register VR. When the execution of the vector add instruction VA finishes, the vector store instruction VST(1) is executed, and the vector data, which is the resultant data thereof, is written, via the load/store unit, into the main storage 12. At the same time, the multiplying operation, between the vector data $\dot{E}$ and $\dot{F}$, is achieved in parallel therewith by using one of the idle vector instruction arithmetic units. When the vector store instruction VST(2) begins operating, the vector data $\dot{G}$, which is the resultant data is stored, via the load/store unit, into the main storage 12. Thus, the instructions can be completely executed, according to the specified identification numbers (1), (2), (3) ... , but free from the predetermined execution sequence of the programs (refer to FIG. 3A), by utilizing the registers 132-0, 132-1, 132-2 ... , the instruction supply discriminator 133 and the registers 134-0, 134-1, 134-2 ... .

As explained in detail hereinbefore, according to the present invention, since the various kinds of scalar instructions and the vector instructions can arbitrarily be rearranged in a serial sequence or a parallel sequence, the parallel processing mode is performed in the information processing system without inducing any undesired logical conflict and, thereby, the system can function as a very high-speed system, compared to the prior art system having both the scalar and vector arithmetic units therein.

I claim:

1. An information processing system, comprising:

main storage; and a data processor, connected to said main storage, receiving sequential application program instructions from the main storage and returning, to the main storage, resultant data after being processed according to a predetermined data process, the sequential application program instructions including preceding instructions a synchronization instruction and following instructions, and said data processor comprising:

an instruction controller connected to the main storage; and arithmetic units, connected to the instruction controller, the instruction controller functioning to receive the instructions from the main storage and distribute the instructions, the arithmetic units receiving respective instructions distributed by the instruction controller;

the synchronization instruction being inserted, in advance into the sequential application program instructions supplied sequentially from the main storage, the following-instructions, which are provided sequentially after the occurrence of said synchronization instruction, are reserved or inhibited by said instruction controller from being executed until execution of the preceding-instructions, which are provided sequentially before occurrence of said synchronization instruction, said following-instructions are executed after said preceding-instructions have been completely executed.

2. An information processing system as set forth in claim 1, wherein said preceding-instructions comprise both instructions which must be executed in a serial processing mode and instructions which can be executed, simultaneously, in a parallel processing mode, a serialized-starting instruction is inserted immediately after a last instruction of the preceding group of said instructions to be executed in the serial processing mode, a serialized-releasing instruction is inserted immediately before a first instruction of the following group of said instructions to be executed in the serial processing mode with respect to the preceding group of said instructions, the instructions, which have been provided before the serialized-starting instruction, are executed before said first instruction will start being executed.

3. An information processing system as set forth in claim 2, wherein said arithmetic units comprise both a scalar arithmetic unit, connected to the instruction controller, for executing scalar arithmetic instructions and a vector arithmetic unit, connected to the instruction controller, for executing vector arithmetic instructions.

4. An information processing system as set forth in claim 3, wherein said system further comprises a synchronization control circuit, connected to said vector arithmetic unit, said vector arithmetic unit cooperates with the synchronization control circuit, the synchronization control circuit comprising:

a wait instruction detecting circuit, connected to said instruction controller, for detecting said synchronization instruction provided from said instruction controller; and an instruction finish detecting circuit, connected to said main storage, said instruction controller, said vector arithmetic unit and said wait instruction detecting circuit, for detecting the finish of execution of all the preceding vector arithmetic instructions, and when the wait instruction detecting circuit detects said synchronization instruction, the wait instruction detecting circuit generates a signal indicating that the following vector arithmetic instructions must not be provided from said instruction controller to said vector arithmetic unit until said instruction finish detecting circuit detects that all of the preceding vector arithmetic instructions have been completely executed.

5. An information processing system as set forth in claim 2, wherein when there are a plurality of pairs of instructions, each of the pairs comprising said last instruction and said first instruction, identification numbers are added to respective pairs distinguishing said pairs of instructions from each other.

6. An information processing system as set forth in claim 1, wherein instructions, which are to be provided before said synchronization instruction comprise both instructions which can be executed in a parallel processing mode and instructions which must be executed in a serial processing mode, an identification code is added to a last instruction of the preceding group of said instructions to be executed in the serial processing mode, an identification code is added to a first instruction of the following group of said instructions to be executed in the serial processing mode, with a pair of instructions comprising said last and first instructions both having said identification codes executed before the execution of said synchronization instruction.

7. An information processing system as set forth in claim 6, wherein when there are a plurality of pairs of instructions, each of the plurality of pairs comprising said last instruction and said first instruction, identification code numbers are added to respective pairs distinguishing said pairs of instructions from each other.

8. An information processing system, comprising:

main storage means for storing data and application program instructions including sequentially arranged scalar instructions and vector instructions having a synchronization instruction therein where the synchronization instruction is for synchronizing parallel instruction processing of the scalar and vector instructions and said main storage means for generating a storage completion signal when a storage operation is complete;

instruction controller means, connected to said main storage means, for sequentially fetching the scalar and vector instructions from said main storage means, for separately outputting the scalar and vector instructions, for generating operation end information in dependence upon the vector instructions when a related group of application program instructions have been output and for inhibiting the outputting of the scalar and vector instructions;

scalar arithmetic means, connected to said main storage means and said instruction controller means, for receiving the scalar instructions and processing the data stored in said main storage means in dependence upon the scalar instructions, for generating a scalar instruction finish inhibit signal during execution of the scalar instructions containing the synchronization instruction and for generating a scalar instruction end signal when the scalar instructions containing the synchronization instruction have finished executing; and vector arithmetic means, connected to said main storage means and said instruction controller means, for receiving the vector instructions and for processing the data stored in said main storage means in dependence upon the vector instructions, said vector arithmetic means comprising:

an instruction register, connected to said instruction controller means, for storing and passing therethrough the vector instructions and for generating a first empty signal when said instruction register is empty;

pipe line processor means, connected to said instruction register and said main storage means, having pipe line processors, for decoding the vector instructions, for processing the data stored in said main storage means in dependence upon the vector instructions and for generating a process finished signal when the processing is finished, said pipe line processor means includes an identification register and said vector instructions have an identification number and include a serialized starting instruction and a serialized releasing instruction for synchronizing the vector instructions distributed to different pipe line processors;

an instruction buffer, connected to said instruction register and said pipe line processor means, for storing and passing therethrough vector instructions, for generating a buffer full signal when said instruction buffer is full and for generating a second empty signal when said instruction buffer is empty;

an operation end receiver, connected to said instruction controller means, for receiving the operation end information and for generating an operation end signal;

an instruction finish detecting circuit, connected to said main storage means, said pipe line processor means, said instruction register and said instruction buffer, for generating a vector instruction end signal in dependence upon the first empty signal, the second empty signal, the process finished signal and the storage completion signal;

wait instruction detecting means, connected to said instruction register and said instruction finish detecting circuit, for generating a wait signal in dependence upon the synchronization instruction and the instruction end signal;

a control register, connected to said instruction register, for storing a parallel/serial indicator indicating a parallel or a serial processing mode;

inhibit means, connected to said instruction controller means, said control register, said operation end receiver, said instruction buffer, said wait instruction detecting means and said instruction finish detecting circuit, for generating a vector instruction finish inhibit signal in dependence upon the parallel/serial indicator, the operation end signal, the buffer full signal, the wait signal and the instruction end signal, said instruction controller means being inhibited from transferring vector instructions to said vector arithmetic means by the vector instruction finish inhibit signal;

an instruction holding register connected to said instruction register and said pipe line processor means; and an instruction dispatch controller, connected to said instruction register, said instruction holding register and said identification register, for assigning an identification number to said pipe line processor means, for storing the identification number from said serialized starting instruction in said pipe line processor means, for transferring to said pipe line processor means only those vector instructions with the identification number and for temporarily storing an instruction located sequentially after the serialized releasing instruction in said instruction holding register until said pipe line processor means is available, said instruction controller means inhibiting outputting of scalar and vector instructions when the vector instruction finish signal or the scalar instruction finish inhibit signal is received and allowing outputting of scalar and vector instructions after an inhibition when the vector instruction end signal and the scalar instruction end signal have both been received, so that the related group of application program instructions are all processed before a next related group of application program instructions is processed.

9. An information processing system as set forth in claim 8, wherein said vector instructions have a first identification number and said vector arithmetic means has a first identification number, and wherein said system further comprises:

a second vector arithmetic means, connected between said instruction controller means and said main storage means, having a second identification number;

an instruction supply discriminator, connected to said instruction register and both said vector arithmetic means, for loading said instruction register when said pipe line processor means is available;

an idle register, connected to said instruction supply discriminator, for storing said vector instructions when said pipe line processor means is busy; and an instruction control unit, connected to said idle register, said instruction supply discriminator and said instruction controller means, for transferring said vector instructions having the first identification number to said vector arithmetic means having the first identification number.

* * * * *

UNITED STATES PATENT AND TRADEMARK OFFICE
CERTIFICATE OF CORRECTION

PATENT NO. : 5,499,350   Page 1 of 2
DATED : March 12, 1996
INVENTOR(S) : Uchida et al.

It is certified that error appears in the above-indentified patent and that said Letters Patent is hereby corrected as shown below:

```
Title Page, before "[56] References Cited" insert
--Foreign Application Priority Data
December 29, 1979   [JP] Japan ........170803--
Title Page, under "[57] Abstract"
     line 4, after "data" insert --units--;
     line 7, delete "(12)" (both occurrences);
     line 18, delete "(POST)";
Column 1, line 60, after "recognizable" insert
     --and--;
  Column 3, line 31, after "FIG. 4", delete "is," and
     after "4B," insert --is--;
Column 4, line 24, "operation" should be
     --operations--;
Column 5, line 50, after "executed" insert --in-;
```

UNITED STATES PATENT AND TRADEMARK OFFICE
CERTIFICATE OF CORRECTION

PATENT NO. : 5,499,350
DATED : March 12, 1996
INVENTOR(S) : Uchida et al.

It is certified that error appears in the above-indentified patent and that said Letters Patent is hereby corrected as shown below:

```
Column 7, line 7, "the" (first occurrence) should be
     --a--;
Column 9, line 51, "FIG. 4A," should be --FIG. 4,--;
Column 9, line 60, "clock, pulse" should be --clock
     pulse--;
Column 10, line 4, "unit, 14" should be --unit 14,--;
Column 13, line 14, after "122-1" insert --,--;
Column 13, line 54, "instruction" should be
     --instructions--;
```

Signed and Sealed this

Twenty-seventh Day of August, 1996

Attest:

BRUCE LEHMAN

*Attesting Officer*     *Commissioner of Patents and Trademarks*